United States Patent [19]

Leschinger

[11] Patent Number: 4,901,202

[45] Date of Patent: Feb. 13, 1990

[54] CONTROLLED ACCESS TELECOMMUNICATIONS EQUIPMENT CABINET

[75] Inventor: Matt Leschinger, Wheaton, Ill.

[73] Assignee: Reliance Comm/Tec Corporation, Cleveland, Ohio

[21] Appl. No.: 314,268

[22] Filed: Feb. 24, 1989

Related U.S. Application Data

[63] Continuation of Ser. No. 35,094, Apr. 6, 1987, abandoned.

[51] Int. Cl.$^4$ ............................................. H05K 5/00
[52] U.S. Cl. .................................... 361/390; 361/428; 361/429
[58] Field of Search ........................ 220/4 R, 4 F, 84; 312/257 SK, 257 SM, 257 A, 283; 361/331, 390, 391, 428, 429

[56] References Cited

U.S. PATENT DOCUMENTS

| | | | |
|---|---|---|---|
| 2,041,112 | 5/1936 | Bucher | 361/334 |
| 2,077,160 | 4/1937 | Wilson, Jr. | 361/334 |
| 2,542,853 | 2/1951 | Wills | 361/334 |
| 3,001,102 | 9/1961 | Stietel et al. | 361/390 |
| 3,188,524 | 6/1965 | Williams | 361/390 |
| 3,502,237 | 3/1970 | Verhein et al. | 220/4 F |
| 3,589,547 | 6/1971 | Hambleton | 220/4 F |
| 4,307,436 | 12/1981 | Eckart et al. | 361/334 |
| 4,369,484 | 1/1983 | Fugate et al. | 361/390 |

FOREIGN PATENT DOCUMENTS

| | | | |
|---|---|---|---|
| 0639104 | 3/1962 | Canada | 361/331 |
| 0563197 | 8/1944 | United Kingdom | 361/391 |

Primary Examiner—Greg Thompson
Attorney, Agent, or Firm—Caliste J. Alster

[57] ABSTRACT

A controlled access telecommunications equipment cabinet is a generally rectilinear enclosure having a plurality of external sides and interior partitions defining a plurality of separate, individual compartments interiorly of the enclosure. At least one access panel on each of the external sides provides access to one and only one of the compartments, such that different compartments are accessible from respective different ones of the access panels. Each access panel is further provided with an associated locking mechanism requiring a corresponding mating unlocking mechanism for opening of the associated access panel. The respective unlocking mechanisms are each of a different type such that controlled access to each of the individual compartments through an associated access panel may be achieved by controlling the distribution of the respective unlocking mechanisms.

3 Claims, 4 Drawing Sheets

CONTROLLED ACCESS TELECOMMUNICATIONS EQUIPMENT CABINET

This application is a continuation of application Ser. No. 035,094 filed Apr. 6, 1987, now abandoned.

BACKGROUND OF THE INVENTION

This invention relates to a cabinet for housing electronic equipment, terminal blocks and other equipment and more particularly to such a cabinet which partitions equipment in a manner such that access thereto is controlled as well as providing various other features.

DESCRIPTION OF THE PRIOR ART

Cabinets or closures are used in the telecommunications industry to provide housings for a variety of equipment. Typically, the equipment housed therein may be a combination of electronic equipment such as a digital carrier system, a cross-connect field, power outlet(s), power equipment for the electronic equipment, cable splicing equipment, etc. As presently designed, such cabinets provide access to the equipment housed therein by either front and/or rear doors. All of the functional activity associated with equipment can only take place in the main cabinet opening which is accessible through the front and/or rear doors.

Therefore, in cabinets as presently designed the opening of the doors allows access to all of the equipment housed therein.

Typically, telephone operating companies assign craftspersons of differing skill levels to install, maintain and repair each of the various above-described equipment normally housed in such a cabinet. It is desirable that only craftspersons of the requisite skill level have access to the equipment associated with that skill. Presently designed cabinets do not provide for that limited access. Such cabinets provide access to the totality of their interiors, including all of the electronic equipment housed therein even if the craftsperson is only, for example, to install, maintain or repair the splices or the equipment for making the same.

In addition, such cabinets have a support structure or base. The base may be either a solid, single structure or two pedestal/column type structures. Typically, the cabinet, including the support structure, is lowered over the telephone cable associated with the cabinet. The cbale is then routed through the support structure. Alternatively, the cable may be pulled through the support structure. In either case, this routing or pulling of the cable through the support structure requires the craftsperson to perform that function in a congested or restricted area. Also, the area in which the cable is normally worked on or secured is located in the same general area as is the equipment housed in the cabinet. Additionally, access to the support structure is through the front doors. Thus, in the presently designed cabinet the craftsperson working with the cable has both a limited area in which to perform the cable routing as well as unnecessary access to the entire contents of the cabinet.

One example of a prior art cabinet is the MODCAB closure manufactured by assignee's Reliable Electronic/Utility Products operating unit. That cabinet has a single, solid structure for the base. Another example of a prior art cabinet is that manufactured by AT&T Technologies (formerly Western Electric Company). That cabinet uses the two pedestal/column type structures for a support base.

BRIEF DESCRIPTION OF THE DRAWINGS

The features of the present invention which are believed to be novel are set forth with particularity in the appended claims. The organization and manner of operation of the invention, together with further objects and advantages thereof, may best be understood by reference to the following description taken in connection with the accompanying drawings in the several figures of which like reference numerals identify like elements, and in which:

DETAILED DESCRIPTION OF THE ILLUSTRATED EMBODIMENT

Figure 1:
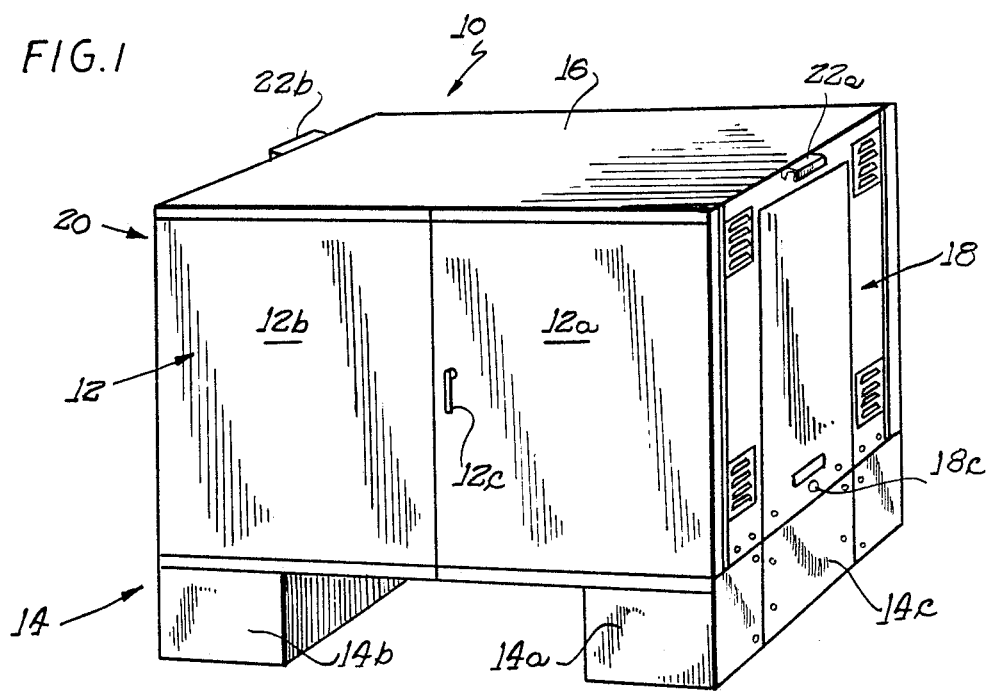
FIG. 1 front and right side perspective view of an equipment cabinet in accordance with the invention.

Referring to the FIG. 1, there is front, top and right side view of a cabinet 10 constructed in accordance with the present invention. The term "housing" (20) will be used hereinafter to refer to that part of cabinet 10 in which various equipment such as the cross-connect terminals and/or electronic equipment, etc. are mounted. The term "base assembly" (14) will be used hereinafter to refer to that part of cabinet 10 on which the housing 20 is mounted, the housing 20 and base assembly 14 making up the cabinet 10.

As shown in FIG. 1, cabinet 10 has a housing 20 which has a front wall or panel 12 which in turn includes a pair of front access panels or doors 12a, 12b. These doors are hingedly mounted to allow access to the interior of the housing. A locking mechanism 12c is included on door 12a. As is well known in the art a special mating unlocking tool (not shown) is required to unlock the doors. The locking mechanism 12c may also include means (not shown) for further securing the mechanism with a padlock.

Housing 20 also includes a top wall or panel 16, a right side wall or panel 18 having an access panel or door 18a, with locking means 18c and lifting rails 22a, 22b mounted on the right and left sides, respectively, of the housing. Base assembly 14 is preferably a split base arrangement made up of two similar upstanding structures 14a and 14b. Structure 14a is adjacent to the right side of the housing whereas structure 14b is adjacent to the left side of the housing. Structure 14a includes therein a removable access panel 14c. As will be described in more detail hereinafter, the means for routing of cables located on the right side 18 of cabinet 10 and access is provided thereto by removing panel 14c and opening door 18a.

Figure 2:
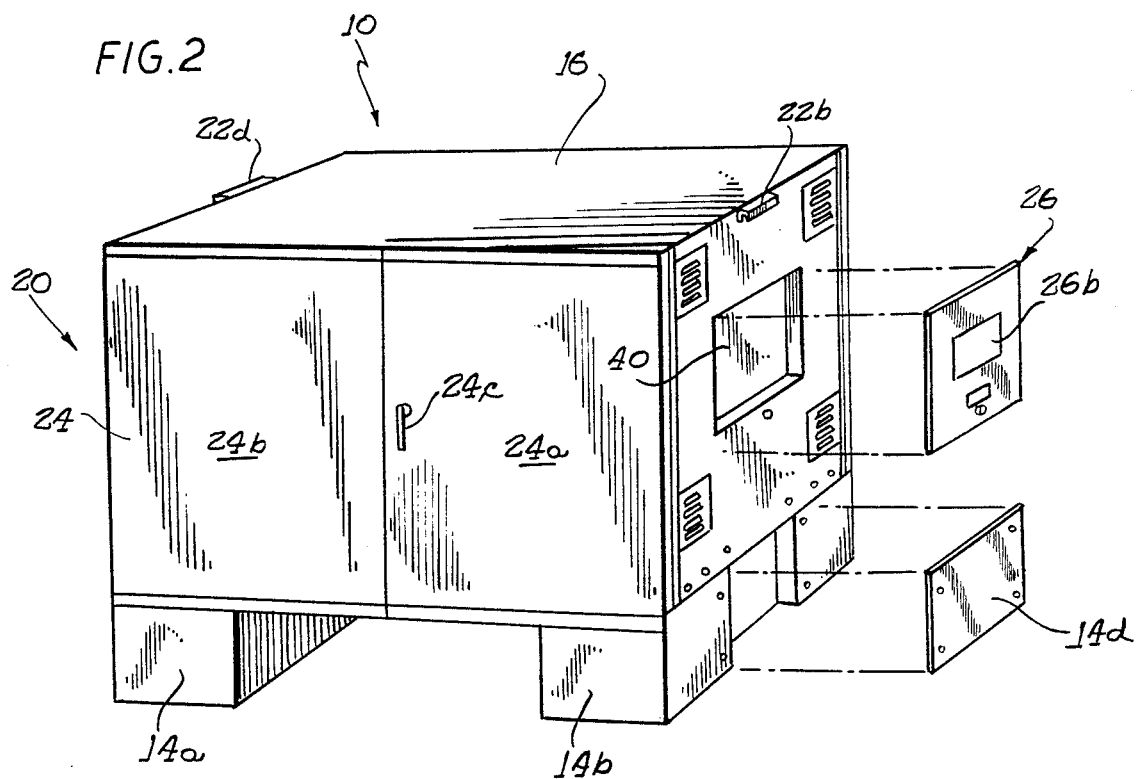
FIG. 2 is a rear and left side view of the equipment cabinet of FIG. 1.

As shown in FIG. 2, housing 20 also has a rear wall or panel 24 which may also include a pair of rear access panels or doors 24a, 24b. These doors are hingedly mounted to allow access to the interior of the housing. A locking mechanism 24c which is essentially identical to locking mechanism 12c is included on door 24a.

Housing 20 also includes left side 26 having a compartment 40 defined by interior partitions 40a, 40b, etc. accessible by way of an access panel or door 26a. Access panel 26a may also include therein a window 26b and is provided with locking means 26c. Pedestal structure 14b includes therein a further compartment 15 accessible by way of a removable access panel 14d. Means (not shown) for routing and connecting an A.C. powerline for providing A.C. power is located in compartments 15, 40 on the left side 26 of cabinet 10 and access is provided thereto by removing panel 14d and opening door 26a.

Figure 3:
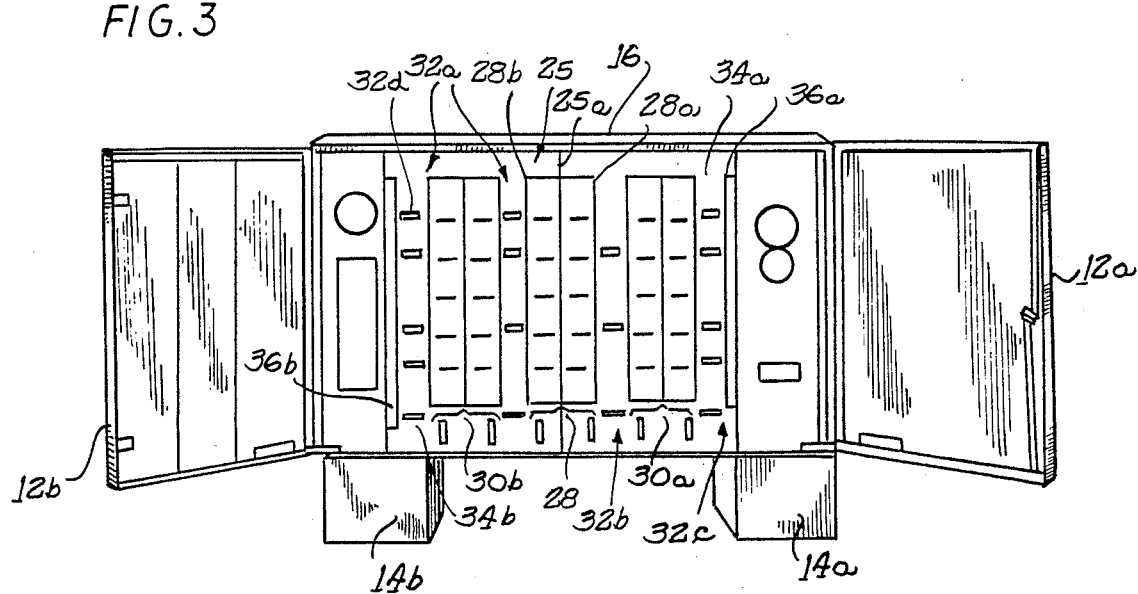
FIG. 3 is a front elevation of the equipment cabinet of FIGS. 1 and 2, with front access panels open to reveal the contents of a compartment therebehind.

Cabinet 10 may include a compartment 25 defined by interior partitions 25a, 25b, 25c, etc. (see FIG. 3) for cross connect terminals of a type well known in the art. These terminals allow for a cross connection between the central office cable pairs and the subscriber cable pairs. One such example of a representative configuration for the cross connect terminals mounted in compartment 25 of the cabinet 10 is shown in FIG. 3. Access thereto is obtained by opening the front doors 12a, 12b.

The cross connect terminals include a feeder field 28 which is made up of terminal blocks arranged in columns and blocks 28a and 28b. The central office cable pairs are connected to the rear of the blocks 28a and 28b. The cross connect terminals also include a distribution field which is made up of terminal blocks arranged in two distinct groups 30a and 30b. The cross connect terminals also include channels 32a, 32b and 32c each of which contain rings 32d. The channels and the rings ensure an orderly routing for the jumper wires used to interconnect appropriate pairs of terminals of the feeder field to appropriate pairs of terminals of the distribution field. The blocks of column 28a and of group 30a are mounted on a panel 34a which may be hinged as diagrammatically indicated at 35a on its right side. The blocks of column 28b and group 30b are mounted on a panel 34b which may be hinged as diagrammatically indicated at 35b on its left side.

Figure 4:
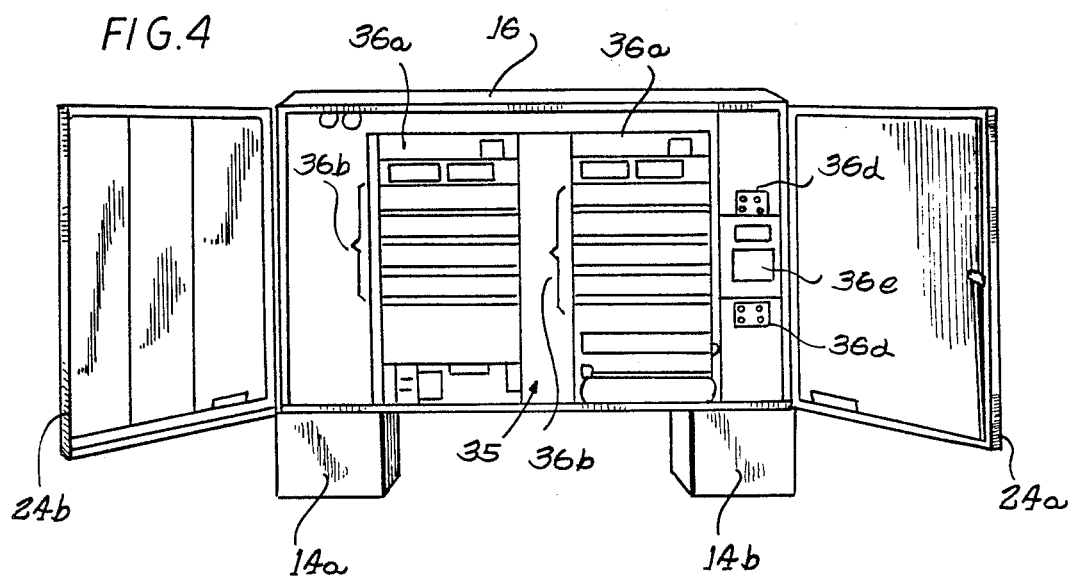
FIG. 4 is a rear elevation of the cabinet of FIGS. 1 through 3, with rear access panels or doors opened to reveal contents of an equipment compartment therebehind.

Cabinet 10 may also include a further compartment 35 defined by interior partitions 35a, 35b, 35c, etc. (See FIG. 4) for certain electronic equipment, power supplies therefor, power outlets, and other associated equipment. One representative configuration for the equipment mounted in compartment 35 of cabinet 10 is shown somewhat diagrammatically in FIG. 4. Access thereto is obtained by opening the rear doors 24a, 24b. As shown therein the equipment may include protector banks 36a for surge arrestor or line protector elements, rack mounted electronic circuit cards 36b, various pieces of power equipment 36c, A.C. outlets 36d, and a load center 36e containing circuit breakers.

Figure 5:
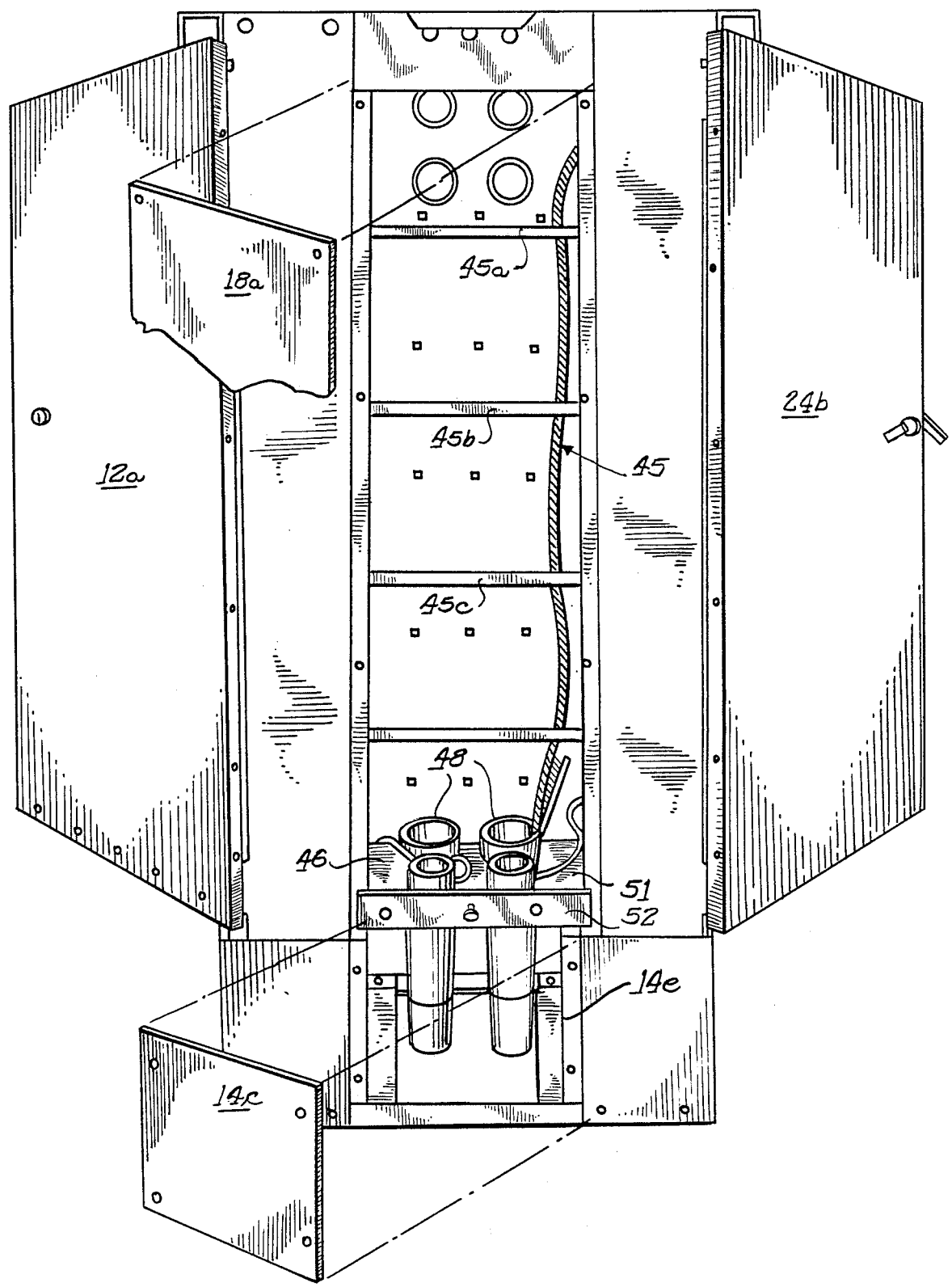
FIG. 5 is a side elevation of the right-hand side of the equipment cabinet of FIGS. 1 through 4, illustrating access panels removed therefrom to permit access to further equipment compartments therebehind.
Figure 6:
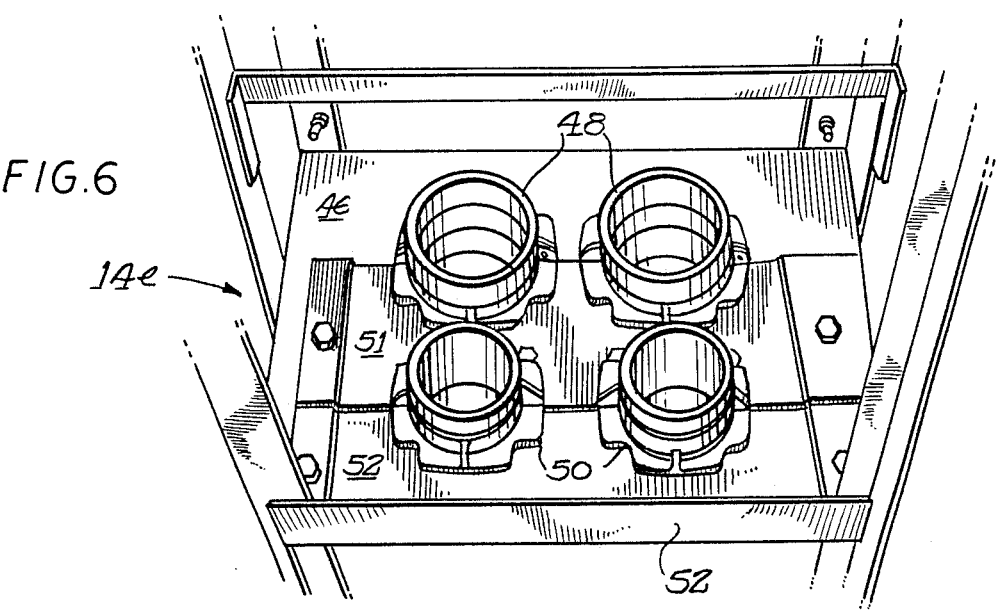
FIG. 6 is an enlarged top perspective view of the mounting plates and split cable sleeve of FIG. 5.
Figure 7:
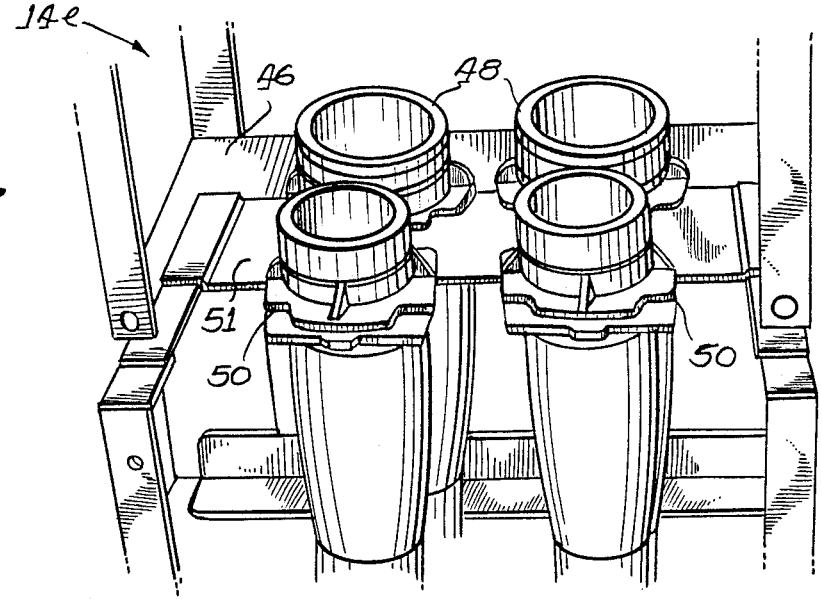
FIG. 7 is a perspective view similar to FIG. 6 illustrating a first one of the mounting plates removed.
Figure 8:
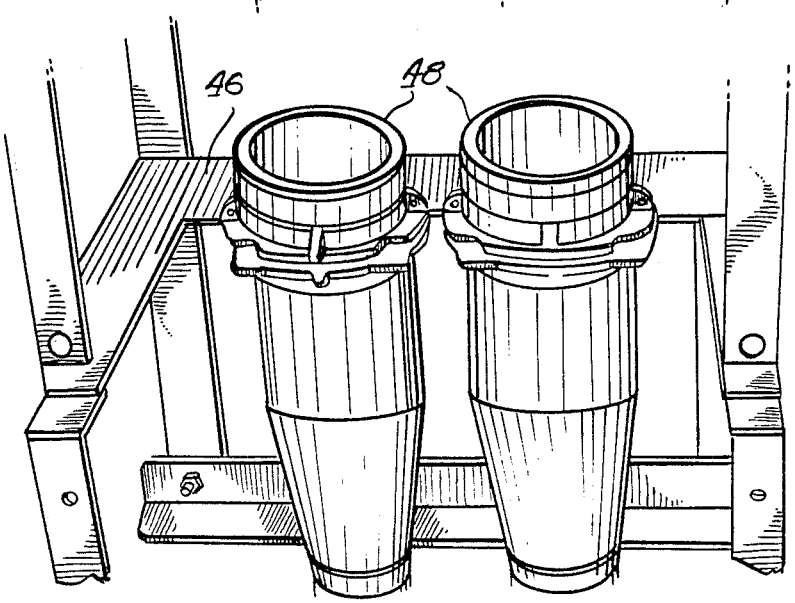
FIG. 8 is a perspective view similar to FIG. 7 and showing a second of the mounting plates removed.

Referring now to FIG. 5, yet another compartment 45 defined by interior partitions 45a, 45b, 45c, etc. is provided on the right side 18 of the housing 20. This compartment 45 is accessible by way of removable access panel or door 18a. A further aligned compartment 14e is accessible by way of removable access panel or door 14c. These compartments 14e, 45 are provided for the routing and splicing of cables from outside the enclosure to service the telephone equipment therewithin. Preferably, the base or support member 14a is aligned with and mounted over an area at which underground cables emerge for routing through compartments 14e and 45. To this end, intermediate mounting plates 51, 52 mount a plurality of split cable sleeves 50, which in turn mount respective cable guiding nozzles 48 to facilitate the entry and routing of cables through compartment 14e and into conveniently accessible compartment 45 for completing routing and/or splicing operations. These mounting plates along with the split cable sleeves are removable (slide forward -- see FIGS. 6, 7 and 8), providing total access to the side of the housing. This removability allows the cabinet to be passed over (sliding over) cable in lieu of lifting over cable, providing an additional feature of the invention, namely, permitting rehabilitation or replacement of old cabinets without cutting the cable or cables. It should be noted that compartment 45 is unencumbered by any equipment unrelated to the splicing and routing of the cables, so as to permit free and unencumbered access to the cables within the compartment for these purposes.

From the foregoing, it will be noted that each of the above described compartments defined in the housing or cabinet 20 receives or mounts a different portion of the equipment for serving a different function or purpose in the telecommunications equipment cabinet. That is, the equipment related to the cross connect terminals and related wiring is all confined to compartment 25, and is inaccessible from any other compartment. Similarly, the electronic equipment and power supplies therefor, as well as the protector banks and load center are all confined to compartment 35 and are inaccessible from any other compartment. In similar fashion, the routing and splicing of cables is performed exclusively in compartments 14e and 45, while the A.C. power routing and connections are available only in compartment 40.

In accordance with a preferred form of the invention, the locking means for the access doors or panels each of the compartments requires a separate and different mating unlocking device or means. That is, one type of unlocking tool, key or the like is required for opening locking means 12c, while an entirely different type is required for locking means 24c, and yet other types of tool and/or keys are required for opening the locking means 26c and 18c, respectively. Thus, it will be appreciated from the foregoing that access to each of the different compartments of the equipment cabinet may be limited to the craftspersons having the necessary skills to peform the function or operations appropriate to the equipment in each compartment, by limiting access to each mating unlocking means or key only to the authorized or properly skilled craftspersons.

Preferably, the cabinet is mounted by means of the split base 14 to a concrete pad through which suitable underground A.C. powerlines and the necessary underground cables have already been fed so as to be in alignment respectively with structures 14a and 14b, to permit the necessary routing and internal connections thereof as mentioned above. As a further advantage the provision of the base assembly 14 as a split base or dual pedestal type of base in the form illustrated and described permits relatively easy separation of the respective compartments 14e and 15 therein for the separate entrance and initial routing of respective cables and A.C. powerlines and alignment thereof with respect to the respective compartments 40, 45 immediately thereabove.

What has been shown and described herein is a novel and improved controlled access telecommunications equipment cabinet in which a plurality of separate and independent compartments are provided for each of a number of groups of interrelated telecommunications equipment required for the telecommunications installation. Advantageously, the equipment may be arranged in these separate and independent compartments in accordance with the skill level of craftsmen required for installation, maintenance and repair of each type of equipment. Accordingly, it is assured that only craftspersons of the requisite skill level will have access to the equipment in a given compartment, which conversely houses only equipment associated with that skill. Such access is limited by means of providing locking access panels or doors for each compartment, each of which locking panels or doors requires some different type of unlocking mechanism, key or the like for access. Accordingly, control of the distribution of the unlocking means or keys will assure that only the craftsperson of the requisite skill will possess an unlocking means or key for, and hence, access to, a given compartment in the equipment cabinet.

While particular embodiments of the invention have been shown and described, it will be obvious to those skilled in the art that changes and modifications of the invention, in its various aspects, may be made without departing from the invention in its broader aspects, some of which changes ad modifications being matters of routine engineering or design, and others being apparent only after study. As such, the scope of the invention should not be limited by the particular embodiments and specific construction described herein but should be defined by the appended claims and equivalents thereof. Accordingly, the aim in the appended claims is to cover all such changes and modifications as fall within the true spirit and scope of the invention.

The invention is claimed as follows:

1. A controlled access telecommunications equipment cabinet comprising: A generally rectilinear enclosure having a plurality of external sides and interior partition means defining a plurality of separate, individual compartments interiorly of said enclosure; at least one access panel on each of said external sides for selectively providing access to one and only one of said compartments; such that different compartments are accessible only from respective different ones of the access panels of said enclosure; and each said access panel being further provided with an associated locking means requiring a corresponding mating unlocking means for opening of the associated access panel; the corresponding unlocking means each being different from each other in unlocking structure means such that controlled access to each of said individual compartments through a predetermined associated access panel only, may be achieved by controlling the distribution of the respective unlocking means; and further including a split base construction for mounting said enclosure to a given surface, said split base comprising at least two spaced-apart, enclosed pedestal-like support members having hollow interiors, the hollow interiors thereof being both in alignment with and an in communication with respective selected compartments of the enclosure by being exposed thereto; and wherein at least one of said pedestal-like support members is provided on its interior with a plurality of removable mounting plates which mount a plurality of removable split cable sleeves.

2. A controlled access telecommunications equipment cabinet comprising: a generally rectilinear enclosure having a plurality of external sides and interior partition means defining a plurality of separate, individual compartments interiorly of said enclosure; at least one access panel on each of said external sides for selectively providing access to one and only one of said compartments, such that different compartments are accessible only from the respective associated ones of said access panels; a pair of pedestal-like support members for mounting said enclosure to a given surface, at least one of said pedestal-like support members having a hollow interior for routing emerging underground cables through said support member and into selected compartments of said enclosure; said at least one support member further including a plurality of removable mounting plates which mount a plurality of removable split cable sleeves in the hollow interior of said at least one support member.

3. A cabinet according to claim 2 wherein each said access panel is further provided with an associated locking means requiring a corresponding mating unlocking means for opening up the associated access panel; the corresponding unlocking means each being different from each other in unlocking structure means, such that controlled access to each of said individual compartments through a predetermined associated access panel may be achieved by controlling the distribution of the respective unlocking means.

* * * * *